Jan. 22, 1924.
J. R. WESTON
1,481,447
ENGINE AND RADIATOR WARMER
Filed Dec. 30, 1922
2 Sheets-Sheet 1
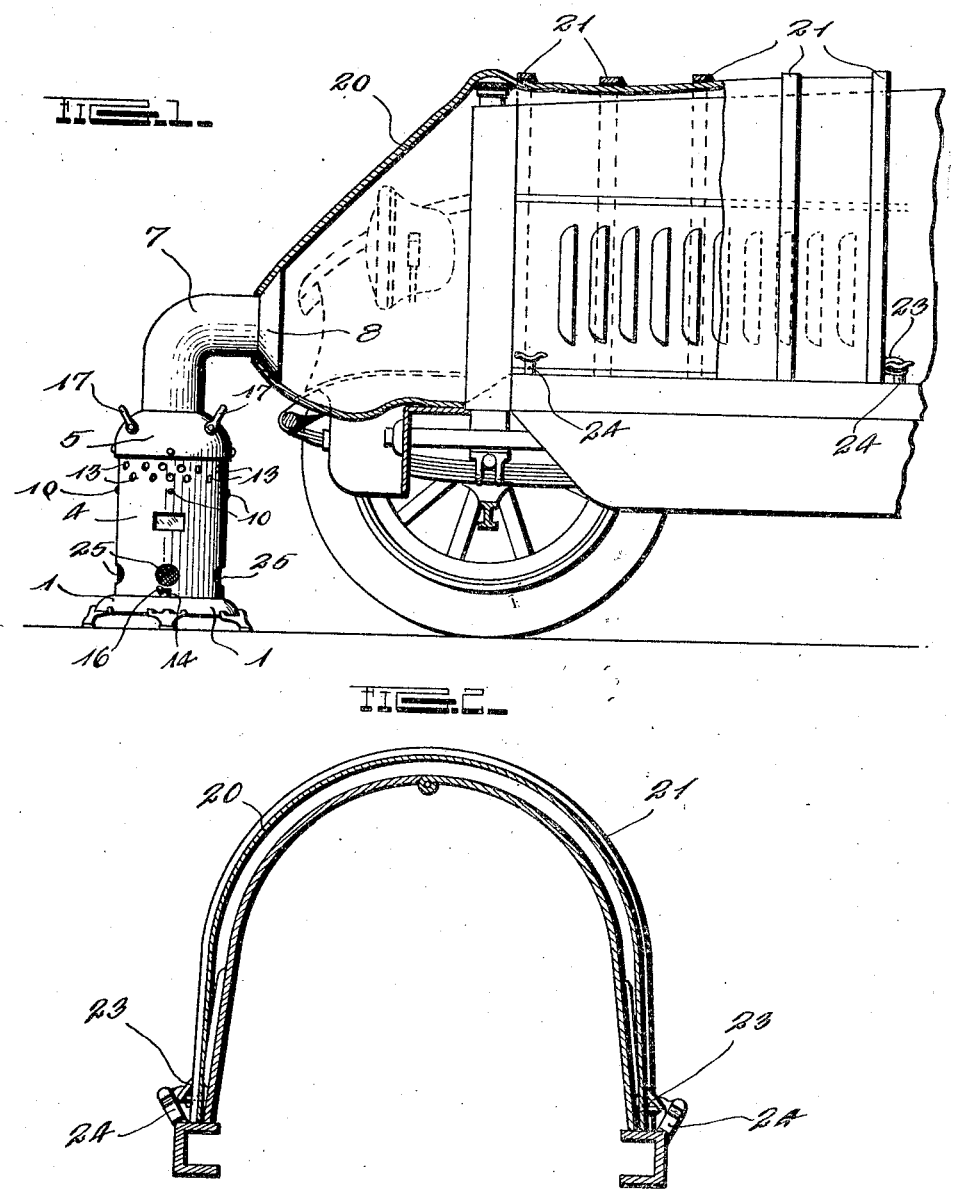
Witness
Inventor
John R. Weston
By *signature*
Attorneys Jan. 22, 1924.
J. R. WESTON
1,481,447
ENGINE AND RADIATOR WARMER
Filed Dec. 30, 1922    2 Sheets-Sheet 2
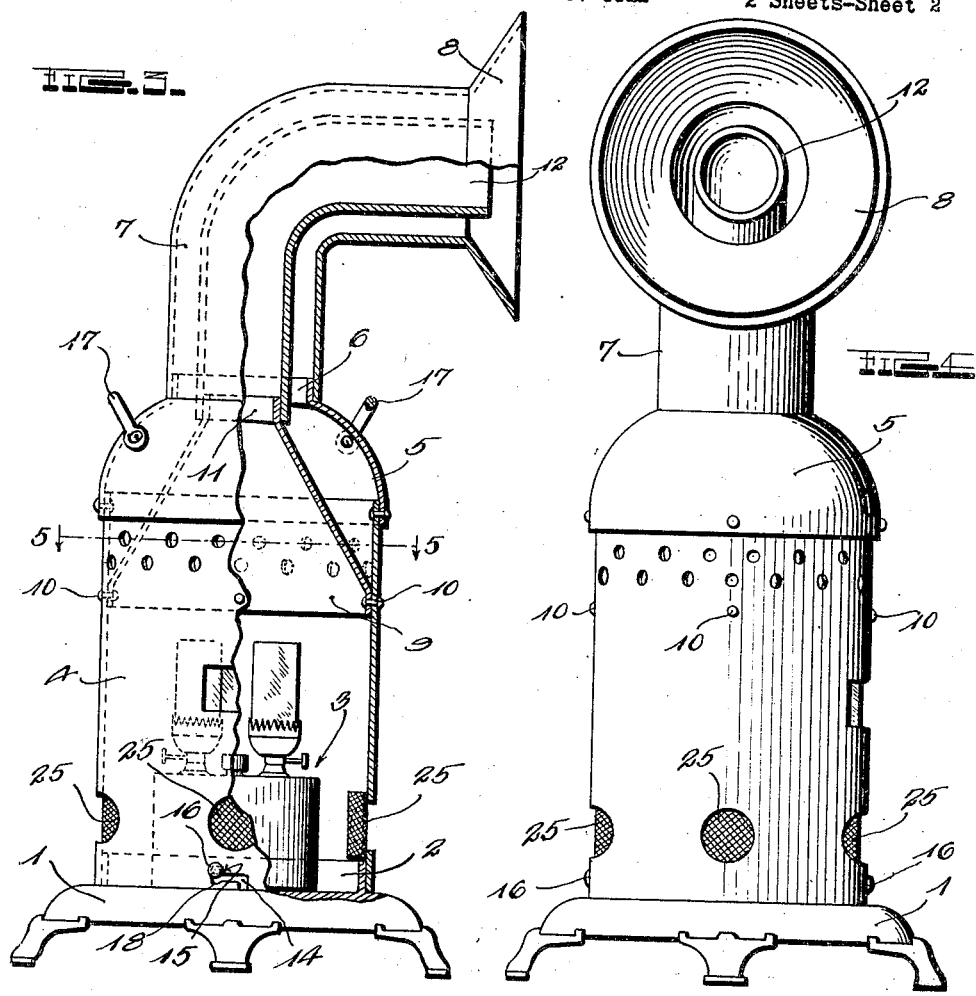
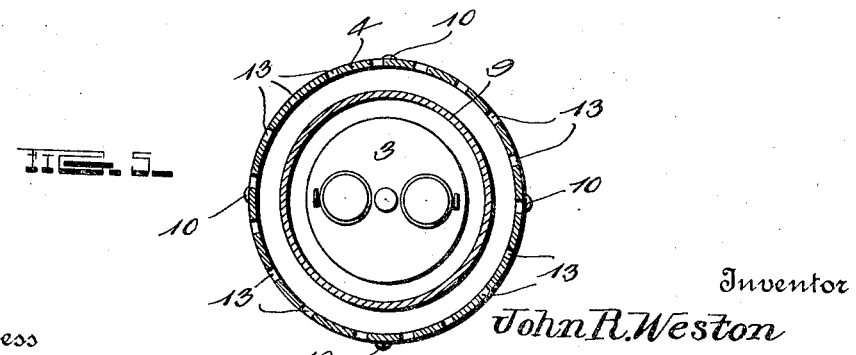
Inventor
John R. Weston Patented Jan. 22, 1924.

1,481,447

UNITED STATES PATENT OFFICE.

JOHN R. WESTON, OF DUBUQUE, IOWA.

ENGINE AND RADIATOR WARMER.

Application filed December 30, 1922. Serial No. 609,849.

*To all whom it may concern:*

Be it known that I, JOHN R. WESTON, a citizen of the United States, residing at Dubuque, in the county of Dubuque and State of Iowa, have invented certain new and useful Improvements in Engine and Radiator Warmers; and I do declare the following to be a full, clear, and exact description of the invention, such as will enable others skilled in the art to which it appertains to make and use the same.

My invention relates to improvements in automobile engine and radiator warmers of the type having a hood or cover to extend over the radiator and hood of the automobile, and a heater for supplying hot air to the interior of the first mentioned hood in front of the automobile radiator, permitting the hot air to pass through the radiator and circulate around the engine to keep it warm to promote easy starting in cold weather.

One object of the invention is to provide an improved form of flexible hood provided with half-hoops for supporting it in spaced relation with the automobile hood, permitting some heat to pass around the latter to assist in the warming operation.

Another object is to provide an improved construction and arrangement of parts for supplying the hot air to the hood. In carrying out this end, I prefer to use an oil burner within a casing resting on the bottom of the latter, a further object being to provide a novel form of detachable connection between the casing bottom or base and its wall, which can be easily detached for giving access to the burner.

With the foregoing in view, the invention resides in the novel subject matter hereinafter described and claimed, the description being supplemented by the accompanying drawings.

Figure 1 is a side elevation partly in section showing the application of my invention to an automobile.

Figure 2 is a vertical transverse section through the hood of the attachment and an automobile hood over which it is positioned.

Figure 3 is a side elevation partly in section of the heater.

Figure 4 is a side elevation looking at the right hand side of Fig. 3.

Figure 5 is a horizontal section on line 5—5 of Fig. 3.

The heater which is shown in detail in Figs. 3, 4 and 5, includes a suitable base 1 having an upstanding flange 2, said base being adapted to support an appropriate oil burner which is preferably in the form of a lamp 3. A cylindrical casing wall 4 surrounds the lamp 3 and the flange 2 and is provided with a detachable connection with this flange, yet to be described. The upper end of the wall 4 is riveted or otherwise connected with a dome-like upper end member 5 having a central heat outlet 6 from which an inverted L-shaped heat outlet pipe 7 extends, the free end of said pipe being flared as indicated at 8.

A conical plate 9 is positioned within the upper end of the wall 4 and has its lower end secured to this wall by rivets or the like 10, while its upper end is formed with a heat outlet 11 from which an inner inverted L-shaped pipe 12 extends, within the outer pipe 7. The disposition of the conical plate within the casing divides the latter into upper and lower compartments, the last named of which is adapted, as is indicated, to accommodate the oil lamp. In the wall of the upper compartment, a multiplicity of openings 13 is provided for the purpose of admitting cold air and it is obvious that this cold air will serve to cool the upper part of the casing and the outer pipe 7 to prevent overheating of these parts which might cause fire. It is also to be noted that the rising cold air taken in at this point serves to create partial suction which co-acts with the discharging hot air from the inner pipe 12 to assist in its discharge from the heater in its passage to the radiator. Hence, the heater is rendered practically fire-proof.

In detachably connecting the wall 4 with the flange 2 so that it may be removed to give access to the lamp or the like 3, I prefer to provide the lower edge of said wall with inverted L-shaped slots 14 whose horizontal portions have shallow notches 15 in their upper edge walls, at the closed end of said horizontal portion. Pins 16 extend outwardly from the flange 2 for reception in the slots 14 and the weight of the wall 4 moves it normally downward so that these pins are seated in the notches 15. By raising the wall 4, however, and turning it by means of suitable handles 17, it will be seen that the wall and base 1 may be disconnected from each other. To prevent accidental disconnection when using the handles 17 for the purpose of carrying the heater from one place to another, the closed ends of the slots 14 are preferably formed with shallow notches 18 in their lower edge walls, in which the pins 16 then seat.

In the form of my invention herein disclosed, the flared end 8 of the heater engages the inner side of a flexible hood or cover 20 having an opening through which the pipe 7 extends, said hood being formed of canvas or any other desired material and being shaped to extend over an automobile hood, as well as having a portion to be positioned between the pipe 7 and the lower end of the radiator as seen in Fig. 1. The portion of the hood 20 adapted to extend over the automobile hood, is provided with a plurality of arched hoops 21, to which it is secured, said hoops being adapted to straddle the automobile hood to space the hood 20 therefrom, permitting a circulation of heat both on the interior and exterior of said automobile hood. Any desired means may be employed for securing the hood 20 in place and at 23 I have indicated one form of fastener which may be engaged with certain of the usual hood clips 24.

By employing the construction shown or a substantial equivalent thereof, the automobile radiator and engine will be effectively heated and there is practically no danger whatever of fire. It is of course necessary to have openings in the wall 4 for supplying air to the lamp or the like 3, but these openings are covered with suitable screens 25 so that there is no danger of any gasoline fumes or the like entering the casing and being ignited by the flame. Hence, every precaution is used in constructing the heater to render it substantially fire-proof.

As excellent results may be obtained from the details disclosed, they may be followed if desired. I wish it understood however that within the scope of the invention as claimed, numerous minor changes may be made.

I claim:

1. An automobile engine and radiator heating device including a flexible cover adapted to extend over the automobile radiator and engine hood, the front portion of the cover extending in advance of the radiator and being constructed to form a hot air intake, and a plurality of arched supports secured to the cover at spaced points and adapted to straddle said hood to space the cover therefrom to permit circulation of the hot air therebetween.

2. A structure as specified in claim 1; together with attaching means for said cover adapted for engagement with the usual hood clips of an automobile.

3. A heater of the class described comprising a casing whose lower end contains a heating element, said casing having a dome-like upper end provided with a heat outlet, an outer inverted L-shaped pipe rising from said outlet and having a flared free end, a conical plate within the upper portion of said casing secured at its lower edge to the casing wall and having at its upper end a relatively small heat outlet, and an inner inverted L-shaped pipe rising from said relatively small heat outlet within said outer pipe, said casing being perforated around said conical plate for the admission of air.

4. A heater of the type specified comprising a casing to contain heating means, a relatively large angular hot air discharge conduit extending from the top of the casing and having a flared end, an internal partition in the casing dividing it into upper and lower compartments, the wall of said upper compartment having a multiplicity of cold air intake openings, said partition having an opening, and a second angular conduit leading from said opening and extending through said first conduit and terminating adjacent the flared end thereof, the inner conduit being spaced from the outer one to provide a passage for the heated air.

In testimony whereof I have hereunto affixed my signature.

JOHN R. WESTON.